US008909024B2

(12) United States Patent
Dontcheva et al.

(10) Patent No.: US 8,909,024 B2
(45) Date of Patent: Dec. 9, 2014

(54) METHODS AND APPARATUS FOR TUTORIAL VIDEO ENHANCEMENT

(75) Inventors: Lubomira A. Dontcheva, San Francisco, CA (US); Suporn Pongnumkul, Seattle, WA (US); Wilmot Wei-Mau Li, San Francisco, CA (US); Shmuel Avidan, Brookline, MA (US); Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 283 days.

(21) Appl. No.: 12/956,863

(22) Filed: Nov. 30, 2010

(65) Prior Publication Data

US 2013/0129316 A1    May 23, 2013

Related U.S. Application Data

(60) Provisional application No. 61/382,813, filed on Sep. 14, 2010.

(51) Int. Cl.
*H04N 9/80* (2006.01)
*H04N 5/76* (2006.01)
*H04N 9/82* (2006.01)
*H04N 5/92* (2006.01)

(52) U.S. Cl.
CPC .............. *H04N 5/76* (2013.01); *H04N 9/8205* (2013.01)
USPC .................................... 386/241; 386/E9.011

(58) Field of Classification Search
USPC ............................. 386/241; 725/43; 715/723
See application file for complete search history.

(56) References Cited

U.S. PATENT DOCUMENTS

| 5,790,117 | A   | * | 8/1998  | Halviatti et al. .............. 715/744 |
|-----------|-----|---|---------|---------------------------------------|
| 6,449,719 | B1  | * | 9/2002  | Baker ........................... 713/168 |
| 7,599,005 | B2  | * | 10/2009 | Sartor et al. .................. 348/536 |
| 7,735,104 | B2  | * | 6/2010  | Dow et al. ........................ 725/52 |
| 8,237,864 | B2  | * | 8/2012  | Chung .......................... 348/578 |
| 8,375,302 | B2  | * | 2/2013  | Oakley et al. ................. 715/723 |
| 2002/0031756 | A1 | * | 3/2002 | Holtz et al. .................... 434/362 |
| 2003/0152904 | A1 | * | 8/2003 | Doty, Jr. ........................ 434/350 |
| 2004/0158476 | A1 | * | 8/2004 | Blessinger et al. ............... 705/1 |
| 2007/0009042 | A1 | * | 1/2007 | Craig et al. ............. 375/240.24 |
| 2009/0035733 | A1 | * | 2/2009 | Meitar et al. .................. 434/118 |

* cited by examiner

*Primary Examiner* — Thai Tran
*Assistant Examiner* — Nien-Ru Yang
(74) *Attorney, Agent, or Firm* — Wolfe-SBMC

(57) ABSTRACT

A plurality of segment transitions in a video data stream is identified. The identifying the plurality of segment transitions includes recognizing an interface feature of a first application interface displayed in the video data stream and generating metadata associating a selected segment transition with a particular point in the video data stream. The interface feature indicates the selected segment transition among the plurality of segment transitions in the video data stream. A navigation system for navigating among the plurality of segment transitions in the video data stream is provided. Responsive to input, navigation to the selected segment transition is performed and the video data stream is displayed from the particular point.

20 Claims, 9 Drawing Sheets

METHODS AND APPARATUS FOR TUTORIAL VIDEO ENHANCEMENT

This application claims benefit of priority to U.S. Provisional Application Ser. No. 61/382,813, which was filed on Sep. 14, 2010.

BACKGROUND

Description of the Related Art

Over the past generation, the expansion in the range and sophistication of tasks that can be performed with inexpensive data processing systems has led to a profusion of new software tools for performing tasks ranging from mathematical modeling of structures to video editing. In many fields of endeavor, each generation of new tools brings to market new features for performing or automating tasks that were either previously impossible or not previously automated.

The growth of software tools has spawned demand for tutorial materials that are designed to provide guidance on the use of software tools to perform new tasks and employ new features. Initially, this demand was met with books about software packages. As the technology for online document presentation improved, books about software packages were replaced with online tutorials that provided explanatory text supplemented by still-image screenshot graphics. These online tutorials reduced the cost of distribution and decreased time-to-market associated with the production and revision of tutorial materials. Unfortunately, however, explanatory text supplemented by still-image screenshot graphics suffers from limitations in the level of granularity with which instructions can be described and illustrated. Simply stated, small details in the performance of an activity are often lost in a series of text descriptions supplemented by still images.

In recent years, however, improvements in the ability to capture and package live-action video of a user's computer screen (screencasting) have given rise to a generation of tutorial videos that provide screen capture renderings of the use of various software tools. These tutorial videos frequently include audio narration and are capable of running on a computer while the user follows along and attempts to re-create the steps being performed in the video. These tutorial videos have become a popular way of teaching and learning to perform procedural tasks in applications. Moreover, the distribution of these videos has been materially enhanced by the availability of video sharing websites.

SUMMARY

A plurality of segment transitions in a video data stream is identified. The identifying the plurality of segment transitions includes recognizing an interface feature of a first application interface displayed in the video data stream and generating metadata associating a selected segment transition with a particular point in the video data stream. The interface feature indicates the selected segment transition among the plurality of segment transitions in the video data stream. A navigation system for navigating among the plurality of segment transitions in the video data stream is provided. Responsive to input, navigation to the selected segment transition is performed and the video data stream is displayed from the particular point.

Figure 1:
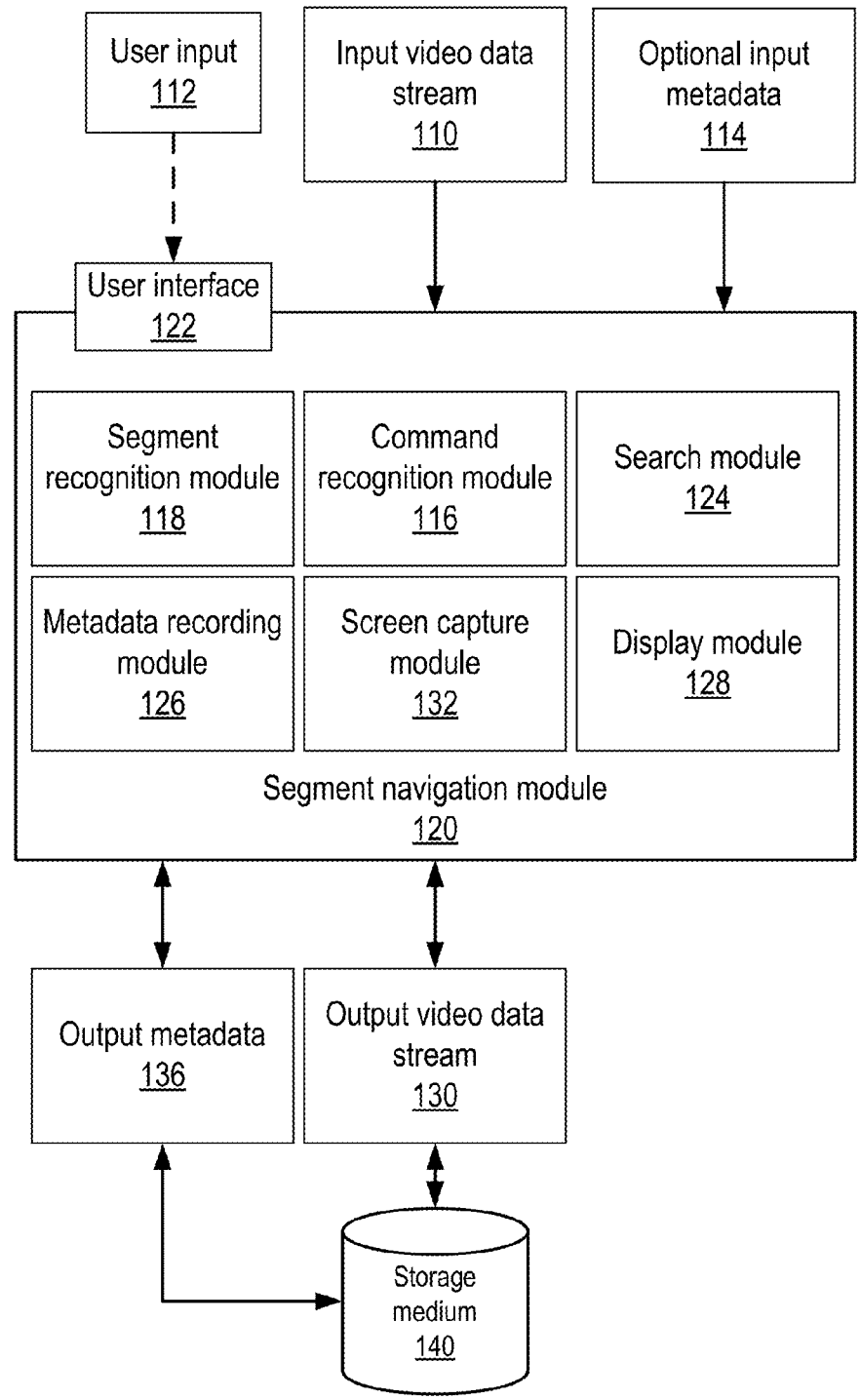
FIG. 1 illustrates a module that may be used to implement tutorial video enhancement according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Tutorial Video Enhancement

Various embodiments of methods and apparatus for tutorial video enhancement allow a user of a tutorial video to navigate between segments of a video data stream. In some embodiments, the segments of the video data stream correspond to discrete steps in a tutorial video for teaching the steps executed in performing a particular activity, such as the performance of a task using a software tool. One skilled in the art will note, in light of having read the present disclosure, that some embodiments of a video tutorial presentation include any or all of live-action video, animations and still image sequence presentations such as slideshows or other comparable media without departing from the scope of this disclosure.

A set of segment transitions in a video data stream is identified. In some embodiments, the video data stream is imported and the segment transitions of the video data stream are identified in the context of a display transaction. In other embodiments, the video data stream is captured by a screen capture utility integrated with a segment navigation utility for the purpose of allowing a user to author enhanced video tutorials. In one such embodiment, an author of the video data stream manually designates locations of segment transitions. Alternatively, a segment identification tool or segment recognition module identifies segment transitions by recognizing the appearance of representations of interface features of an application running in the tutorial video that are typically associated with the transition between steps in the tutorial video, such as the presence of command prompts in dialogue boxes, pull-down menus in a user interface, or toolbars.

Metadata is generated, and the metadata is used to associate a particular point in the video data stream, such as is in some embodiments designated by a time code identifier or other video data stream location identifier, with a segment transition. In some embodiments, an instruction record representing a sequence of instructions executed by the application running in the tutorial video is recorded. The instructions of the instruction sequence are associated with the segment transitions in the metadata and with particular execution times during which the execution of each of the instructions is displayed in the video data stream. In some embodiments, the operations described herein as being associated with segment transitions are performed with respect to segments or points in time within segments. As a result, in some embodiments, actions associating metadata or other data with a segment inherently associate the metadata or other constructs with the segment transitions defining the segment. In some embodiments, the instruction record may be inferred through analysis the video to identify interface shapes associated with particular instructions.

A user of the video data stream is provided with navigation tools for navigating among the set of segment transitions in the video data stream during playback of the video data stream. In addition to conventional forms of navigation, the user can employ the navigation tools to navigate to a selected segment transition and cause the display of the video data stream from the selected segment transition. In some embodiments, the display of the video data stream and the navigation tools are provided as tools, such as a panel, within an existing application.

In some embodiments, an interface activity record of an application open during display of the video data stream is captured. The interface activity record is compared to the instruction record, and responsive to a deviation between the instruction record and the interface activity record, display of the video data stream is adjusted. In some embodiments, if the deviation is a time difference between the instruction record the interface activity record, display of the video data stream is paused. Alternatively, if the pace of user work has exceeded the pace of command execution in the video data stream such that the work being done by the user is reflected in another segment of the video display stream, the video display system may navigate to a next segment transition and resume display of the video display stream. In some embodiments, the interface activity record is saved to metadata for the video. Likewise, in some embodiments, the user is able to enter annotations as comments to metadata, both during authoring and during playback.

In some embodiments, if the deviation is an instruction selection difference between the instruction record and the interface activity record, an alternate video data stream is suggested if such an alternative video data stream is available. In some embodiments, the user can request that the application execute an instruction sequence from the instruction record during display of the video data stream.

Figure 9:
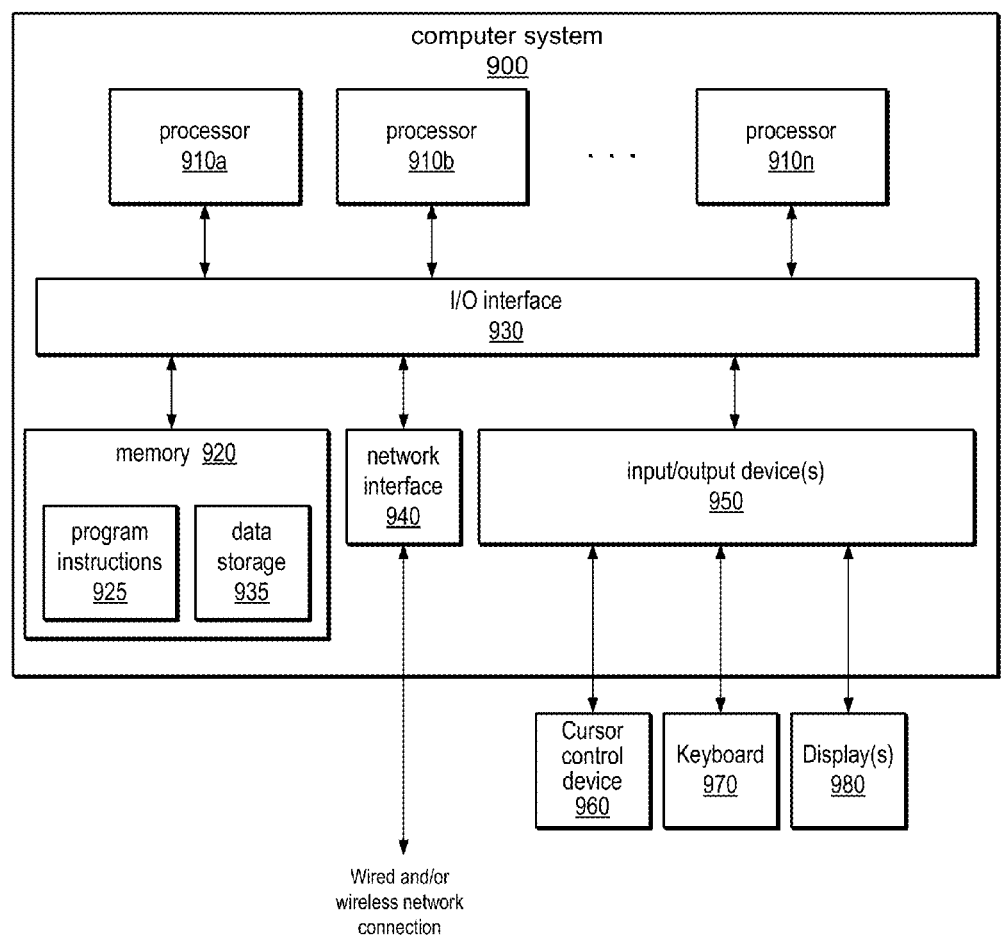
FIG. 9 depicts an example computer system that may be used in some embodiments.

With reference now to the figures, and in particular with reference to FIG. 1, a segment navigation module is depicted. Segment navigation module 120 may implement one or more of the tutorial video enhancement techniques and tools illustrated in FIGS. 1-7. Segment navigation module 120 may, for example, implement one or more of an enhanced video tutorial display tool, an enhanced video tutorial authoring tool, an instruction sequence execution tool, and a tutorial video search and browsing tool. FIG. 9 illustrates an example computer system on which embodiments of segment navigation module 120 may be implemented.

In one embodiment, segment navigation module 120 receives as input one or more input video data streams 110 for output using a display module. Video data streams 110 may include video in any suitable format ranging from Adobe Flash™ video (designated by the filename suffix .flv, .f4v, .f4p, .f4a, .f4b) to legacy formats such as MPEG, Windows™ Media Video, or Quicktime™. Segment navigation module 120 may receive user input 112 activating an enhanced video tutorial display tool. Segment navigation module 120 may identify, using a segment recognition module 118, segment transitions in input video data stream 110 by recognizing interface features associated with the segment transitions, such as the presence of command prompts in dialogue boxes, pull-down menus in a user interface, or toolbars.

Segment navigation module 120 may generate, using a metadata recording module 126, output metadata 136 associating the segment transitions with particular points in input video data stream 110. These points may be identified by video timecode or other video data stream position identifiers. In alternative embodiments, segment navigation module 120 may identify segment transitions in input video data stream 110 using optional input metadata 114 received and associated with input video stream 110. In some embodiments, input metadata 114 will be included in a single container file with input video data stream 110. Segment navigation module 120 provides through user interface 122 a navigation system for navigating among segment transitions in input video data streams 110. Responsive to user input 112, segment navigation module 120 navigates to a selected segment transition and displays, through use of a display module 128, appropriate portions of input video data stream 110.

Segment navigation module 120 may receive user input 112 activating an enhanced video tutorial authoring tool. Segment navigation module 120 may identify, using segment recognition module 118, segment transitions in input video data stream 110 by recognizing interface features associated with the segment transitions. Alternatively, segment recognition module 118 may record user input 112 received through user interface 122 identifying segment transitions or modifying the location of automatically identified segment transitions. In some embodiments, a screen capture module 132 may be used to capture a video data stream and user interface 122 may be used to capture user input 112, including audio narration, instruction input across user interface 122 and other relevant data, such as explanatory help text for display in an output video data stream 130. In such an embodiment, an instruction recognition module 116 may be used to record an instruction record representing commands executed during the capture of the video stream.

A metadata recording module 126 may be used to record metadata including both segment transitions and the instruction record, as well as other input received through user interface 122, including audio narration, instruction input across user interface 122 and other relevant data, such as explanatory help text for display in an output video data stream 130. Segment navigation module 120 may generate output metadata 136 associating the segment transitions with particular points in an output video data stream 130 and including the other metadata described above. Output video data stream 130 may, for example, be stored to a storage medium 140, such as system memory, a disk drive, DVD, CD, etc. In some embodiments, output metadata 136 and output video data stream 130 may be stored in a single container file.

In one embodiment, segment recognition is performed by a segment recognition module 118, which identifies segment transitions by recognizing the appearance of representations of interface features of an application running in the tutorial video that are typically associated with the transition between steps in the tutorial video. Such interface features include the presence of command prompts in dialogue boxes, pull-down menus in a user interface, or toolbars. These interface features may be recognized by segment recognition module through an analysis of typical shape and color patterns in the video data stream using computer vision. For example, segment recognition module can recognize toolbars and dialogue boxes as these tend to exhibit a rectangular shape and grey color in many applications. Further, in some embodiments, shapes of known icons and tools may be provided to facilitate the recognition of important frames that may represent segment transitions. Additionally, in some embodiments, the actuation of commands during use of screen capture module 132 may cause the creation and preservation of metadata with respect to the commands that have been activated. Segment recognition module 118 is, in some embodiments, capable of employing such metadata to ascertain the locations of segment transitions. Further, in embodiments in which manual entry or manual update of segment transitions is supported, segment recognition module 118 supports the entry and recording of user input with respect to segment transitions.

Segment navigation module 120 also supports a search module 124 for locating potentially relevant video tutorials. The use of a search interface with search module 124 is discussed below with respect to FIG. 3 and FIG. 4. In one embodiment, search module 124 accesses a store of tutorial videos (not shown) on storage medium 140. In some embodiments, search module 124 provides through user interface 122 a browsing interface similar to a file manager for viewing details of tutorial videos. Alternatively, some embodiments of search module 124 are capable of searching the Internet (not shown) to find possibly relevant tutorial videos. Assessment of the relevance of tutorial videos can be based on metadata such as output metadata 136 or input metadata 124. When assessment of relevance or searching is performed with respect to metadata such as output metadata 136 or input metadata 124, metadata that may be searched can include help text, instruction records, or comments and descriptions associated with metadata such as output metadata 136 or input metadata 124. Additionally, when Internet searches are performed, comments on a web page containing a potentially relevant tutorial video can be used to assess the relevance of the video, as can parameters such as hit counts for the video.

In some embodiments, segment navigation module 120 may provide a user interface 122 via which a user may interact with the segment navigation module 120, for example to activate an enhanced video tutorial authoring tool, to perform and record commands that are the subject of a video tutorial, to record audio, and to perform other actions as described herein. One example embodiment of a user interface 122 is discussed below with respect to FIG. 3. In some embodiments, the user interface may be used to activate an enhanced video tutorial display tool and provide user interface elements whereby the user may select options including, but not limited to, soft play, soft pause, segment transition selection navigation, a segment list, video searches, instruction entry recording, and instruction record execution, as described below.

Figure 2:
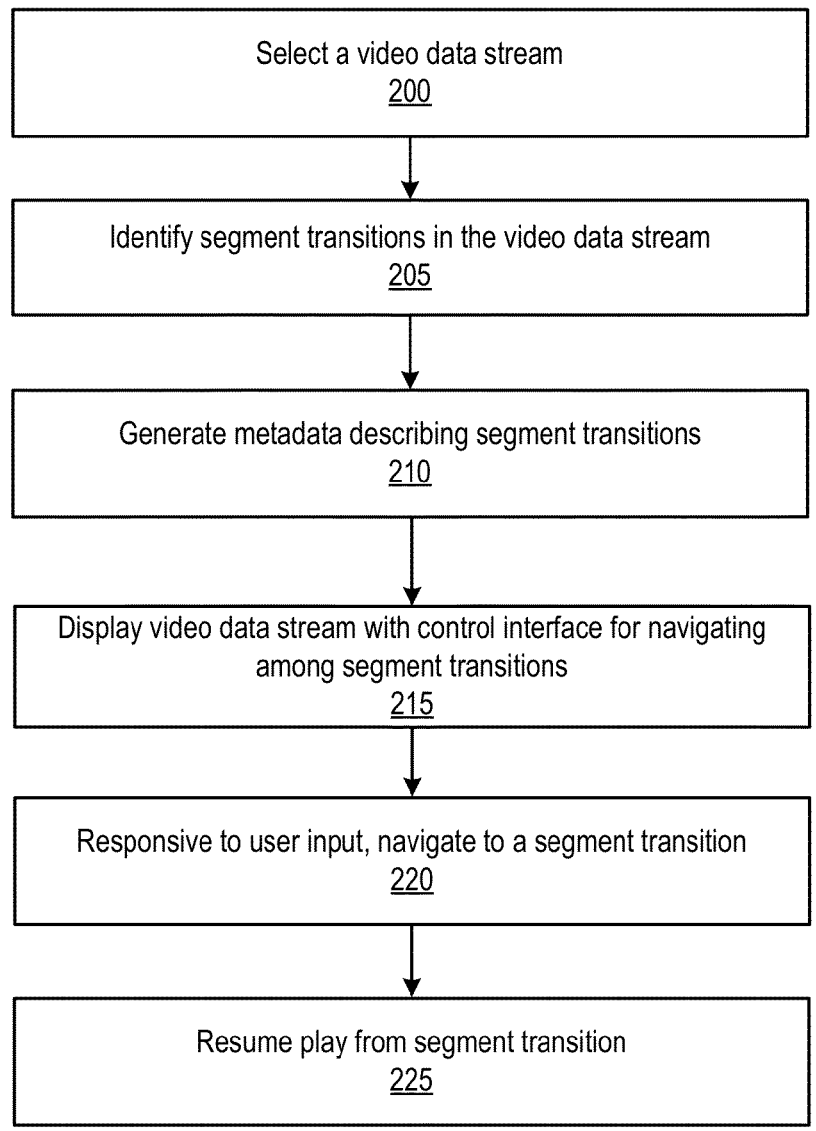
FIG. 2 depicts a high-level logical flowchart of a process for implementing tutorial video enhancement according to some embodiments.

FIG. 2 depicts a high-level logical flowchart of a process for implementing tutorial video enhancement according to some embodiments. A video data stream is selected (200). Turning briefly to FIG. 1, video data streams, such as input video data stream 110 and output video data stream may be selected through manual user input 112 to user interface 122 or through use of a search module 124, as described above.

Returning to FIG. 2, segment transitions in the video data stream are identified (205). In some embodiments, a segment identification tool or segment recognition module identifies segment transitions by recognizing the appearance of representations of interface features of an application running in the tutorial video that are typically associated with the transition between steps in the tutorial video, such as the presence of command prompts in dialogue boxes, pull-down menus in a user interface, or toolbars.

Metadata describing segment transitions is generated (210). In some embodiments, when metadata available for importation includes locations of segment transitions, such metadata describing segment transitions may be used and performance of operations represented by blocks 205 and 210 may be omitted. Turning briefly to FIG. 1, video data streams, such as input video data stream 110 and output video data stream 130 may have accompanying metadata, such as input metadata 114 or output metadata 136, respectively, which may have been generated either in a previous viewing or as a part of the process of video authoring. In some embodiments, input video data stream 110 and output video data stream 130 may be located in a container file with input metadata 114 or output metadata 136, respectively.

Returning to FIG. 2, the video data stream is displayed with a control interface for navigating among segment transitions (215). An example of a control interface is discussed below with respect to FIG. 3. Responsive to user input, navigation to a designated segment transition is performed (220). Various navigation actions are discussed below with respect to FIG. 3. Video data stream play is resumed from the segment transition to which navigation has been designated (225).

Figure 3:
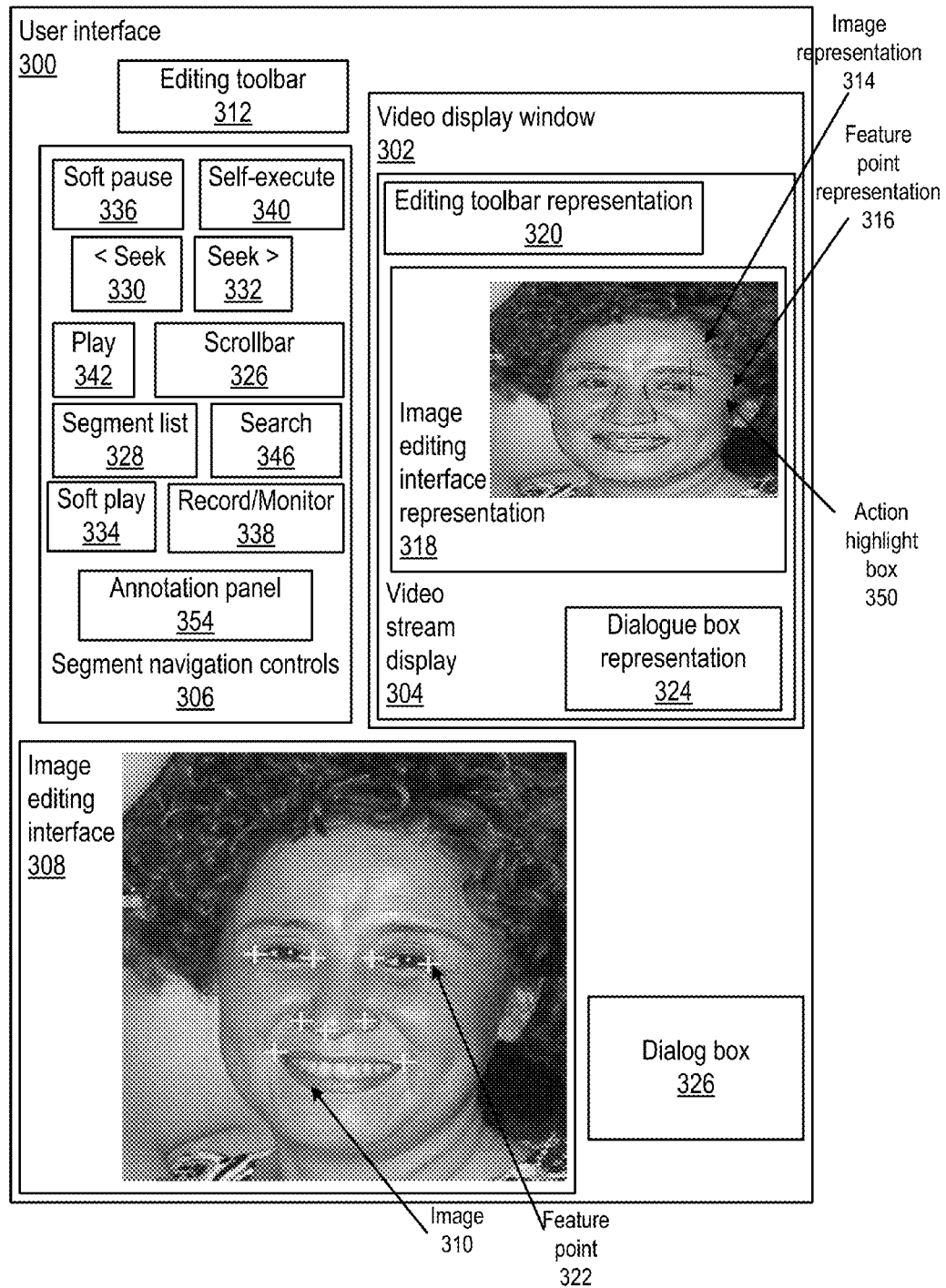
FIG. 3 illustrates one embodiment of a user interface for implementing tutorial video enhancement.

FIG. 3 illustrates one example embodiment of a user interface for implementing tutorial video enhancement. A user interface 300 includes a video display window 302 for displaying a video stream display 304. User interface 300 further includes segment navigation controls 306 for controlling navigation within video stream display 304, including navigation on the basis of segment transitions. Additionally, user interface 300 includes an image editing interface 308 for editing an image 310 using tools contained in an editing toolbar 312 representing the features of an application.

In the example portrayed in FIG. 3, video stream display 304 provides a video tutorial with respect to editing an image using an application, portrayed by image representation 314. The application used in the video output provided by video stream display 304 may be an instance the same application or an similar to the application providing the image editing interface 308. In some embodiments, the two applications will not be identical, however.

User interface features are not shown to scale in FIG. 3, and many details of the user interface are omitted from FIG. 3 in the interest of clarity in the drawings. In some embodiments, video display stream 304 will include multiple forms, types or varieties of media tailored to specific steps being performed. For example, navigating for a menu item or tool can be shown in one screenshot, while time-based actions may be represented with small live-action video clips. A still image is sometimes used, for example, to illustrate menu navigation. Flipping between two images (before and after), is, for example, sometimes used to illustrate the effect of some operations. Jumping through multiple discrete images is sometimes used, for example, to illustrate some actions, using screenshots taken before, during, and after performance of an operation. Live-action video is used, for example, to illustrate complex operations.

A user can watch tutorial video displayed in video stream display 304 and learn to perform the operations depicted in video stream display 304 by performing analogous operations on image 310 using tools contained in editing toolbar 312. In the example portrayed in FIG. 3, a hypothetical designation of a feature point representation 316 on an image representation 314 using an image editing interface representation 318, a dialogue box representation 324, and tools from an editing toolbar representation 320 is portrayed by video stream display 304.

In some embodiments, an action highlight box 350 is provided to call the attention of the user to a step being performed in the video, particularly where the step is small and easily missed. Placement of an action highlight box 350 may be automated, with selection of the placement for action highlight box performed on the basis of movement and change in video stream display 304. Such placement may be edited as part of the adjustments discussed below in step 515 of FIG. 5. In some embodiments, if a user pauses a mouse over action highlight box 350, video display in video stream display 304 pauses. In some embodiments the pause lasts only as long as the user's pointer cursor is paused over action highlight box 350. In other embodiments, pausing a mouse over action highlight box 350 pauses video stream display 304 until a control among segment navigation controls 306 is selected.

While a user is watching tutorial video displayed in video stream display 304 and learning to perform a hypothetical designation of a feature point 322 in image 310 using an image editing interface 308, a dialogue box 326, and tools from editing toolbar 312, segment navigation controls 306 provide the ability for the user to navigate among segment transitions in video stream display 304. In some embodiments, each of the segment navigation controls 306 described below may also be represented by one or more hotkeys for control of video operations. As portrayed in FIG. 3, an example video in video stream display 304 walks through the steps of feature designation, such as selecting a feature designation tool from editing toolbar representation 320, answering questions with respect to the designated features in dialogue box representation 324 and designating a feature point representation 316 in image representation 314. A user may, during play of the tutorial video in video stream display 304, perform the steps of feature designation, such as selecting a feature designation tool from editing toolbar 312, answering questions with respect to the designated features in dialogue box 326 and designating a feature point 322 in image 310. Various of these steps may be associated with segment transitions in the tutorial video.

Within video stream display 318, segment transitions may be identified by visual cues, such as the appearance of editing toolbar representation 320 or dialogue box representation 324. Specifically, segment transitions tend to correspond to discrete steps in a tutorial video and segment transitions are selected to provide easy access to key frames, such as at the beginnings of discrete steps. The beginnings of such discrete steps tend, in many applications, to correspond to the appearance of either a toolbar, such as editing toolbar representation 320, or a dialogue box, such as dialogue box representation 324. Thus, with respect to FIG. 1, when attempting to identify segment transitions in an input video data stream, such as input video data stream 110 of FIG. 1, a segment recognition module, such as segment recognition module 118 of FIG. 1 seeks visual cues, such as the appearance or disappearance of editing toolbar representation 320 or dialogue box representation 324 as identifiers of segment transitions. Such visual cues are readily identified with respect to editing toolbar representation 320 or dialogue box representation 324 on the basis of regular shapes and colorations. In embodiments in which an instruction record is available as metadata, segment transitions can also be identified by patterns in the execution of instructions or commands.

With segments and segment transitions identified, segment navigation controls 306 enable a user to navigate through video stream display 304 on a segment-by-segment basis. A scollbar 326 provides a visual representation of the progress of a user video stream display 304. In one embodiment, scrollbar 326 is a timeline slider enhanced to provide segment-based navigation by providing color-coded sections (not shown) representing each segment of video stream display 304. In some embodiments, double-clicking on a selected segment will cause play to restart at the beginning of the segment. As a mouse hovers over a segment, a text description of the segment is displayed, either in annotation panel 354 or in a callout attached to a mouse pointer (not shown). Alternatively, scrollbar 326 may be enhanced to provide segment-based navigation by providing lines orthogonal to the main axis of scrollbar 326 representing each segment transition of video stream display 304 (also not shown).

In some embodiments, segment navigation controls include a segment list 328, which provides a discussion of the contents of each segment of video stream display 304, including a brief description of the content of each segment and a listing of the start point, end point, and elapsed time represented by the segment. Clicking on a segment listing in segment list 328 will cause display of video stream display 304 from the beginning of the indicated segment.

Actuating a reverse seek button 330 causes display of video stream display 304 from the beginning of the last segment transition traversed in the display of video stream display 304. Similarly, actuation of a forward seek button 332 causes display of video stream display 304 from the beginning of the segment immediately after the segment currently being viewed in the display of video stream display 304. In alternative embodiments, one or both of reverse seek button 330 and forward seek button 332 may be configured to move to a segment transition if actuated once and to move a fixed length of time (e.g. 4 seconds), if double-clicked.

Actuation of a soft play button 334 causes display of video stream display 304 to pause at the beginning of the segment immediately after the segment currently being viewed in the display of video stream display 304 until the user has completed in image editing interface 308 the action being portrayed in the current segment of video display stream 318. Similarly, actuation of a soft pause button 336 causes display of video stream display 304 to pause at the current time code in the display of video stream display 304 until the user has completed in image editing interface all the actions portrayed in the video display stream 318 up until the current time code.

Actuation of a record/monitor button 338 creates a user interface activity record for a user interface to compare the pacing and actions of a user of image editing interface 308 to the actions portrayed in video stream display 304. Such an interface activity record allows for the user interface to pause display of video stream display 304 until the user has completed in image editing interface 308 all the actions portrayed in the video display stream 318 up until the current time code. or alternatively skip to a next segment if a user has completed commands portrayed in video display stream 318 ahead of the pacing of video display stream 318. Alternatively, if a user is deviating from expected instructions as compared between an interface activity record and an instruction record, alternative tutorial videos more in line with the actions reflected in the interface activity record can be suggested in a search interface 346. Actuation of a self-execute button 340 causes execution of commands in image editing interface 308 that are being displayed in image editing interface representation 316 such that a command stream from the instruction record associated with an instructional video is executed with user input as required Search interface 346 is provided to enable the user to find videos applicable to the user's needs. Search interface 346, in one embodiment, includes controls for designating search domains (such as local drives, network drives, or the Internet), facilities for keyword entry, controls for customizing search criteria (e.g., controls for designating a date order of result presentation) or other controls useful in customizing search operations. Search results will be displayed in a format similar to segment list 328, in which clicking on a search result causes download of a tutorial video and display of the tutorial video in video display window 302 (or a separate window, not shown). A play button 342 is provided to enable conventional, unenhanced display of video display stream 318. An annotation panel provides for both the display and entry of help text, notes, and other commentary and annotations provided in the metadata. In some embodiments, the annotations are time-coded for display in sync with the video stream display 304 and time codes associated with each annotation can be configurably displayed.

Figure 4:
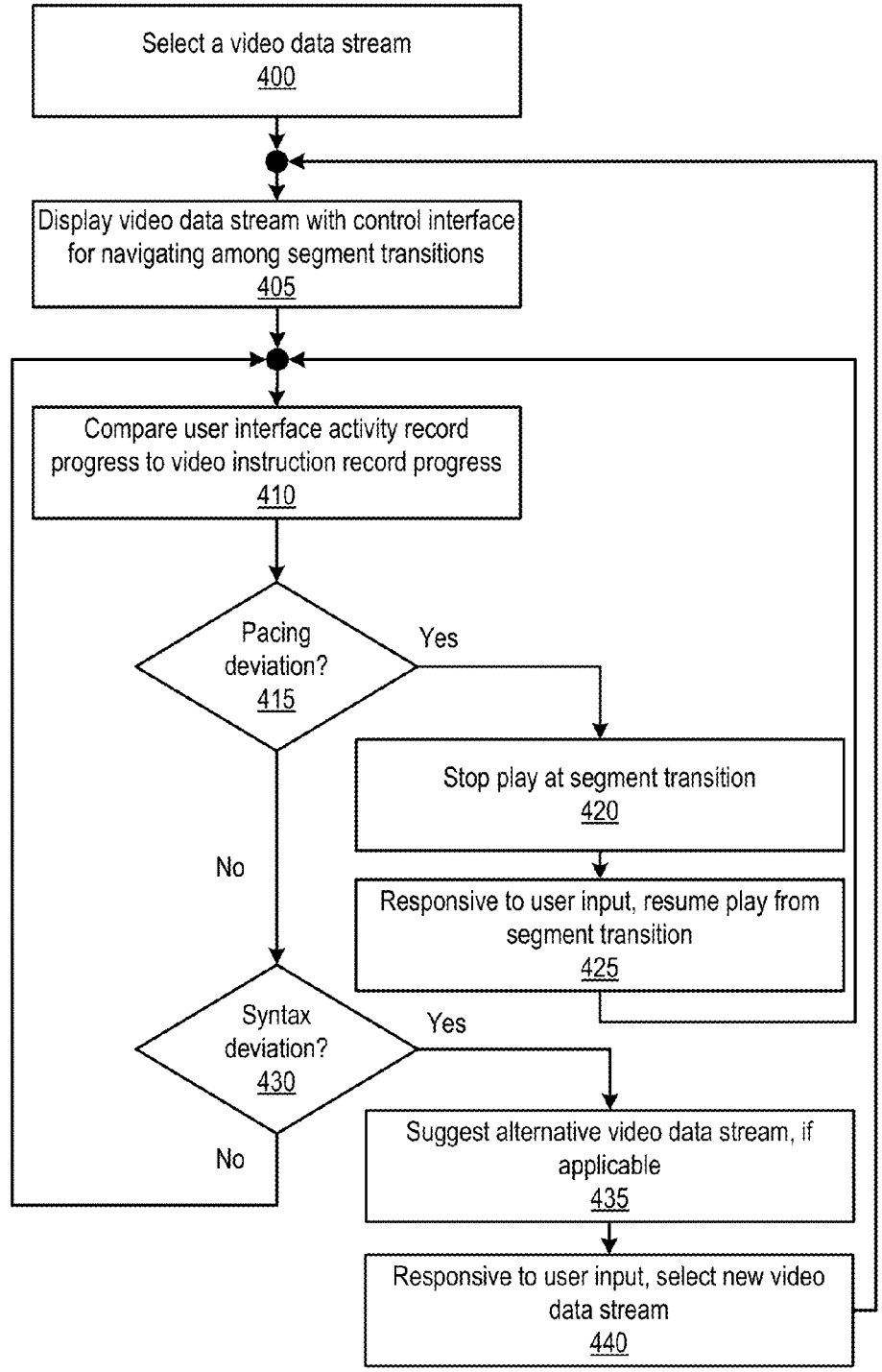
FIG. 4 depicts a high-level logical flowchart of a process for implementing display of a tutorial video with enhancement according to some embodiments.

FIG. 4 depicts a high-level logical flowchart of an example process for implementing display of a tutorial video with enhancement of navigation according to some embodiments. A video data stream is selected (400), as described above with respect to FIG. 1. The video data stream is displayed with a control interface for navigating among segment transitions (405), as described above with respect to FIG. 3.

Progress in a user interface activity record is compared to progress through an instruction record (410). If a pacing deviation is detected (415), such that the user has fallen behind the steps being executed in the tutorial video, then replay of the video is stopped at the next applicable segment transition (420). Play is resumed from the segment transition when user interface activity record is compared to progress through an instruction record and the comparison indicates that the user has caught up to the video (425). Alternatively, in some embodiments, a pacing deviation in which the user has moved ahead of the video can cause the video to skip forward to the next segment transition. The process returns to block 410, which is described above.

If a syntax deviation is detected (430), such that the user has employed steps or selected instructions that differ materially from the steps being executed or the instructions being selected in the tutorial video, then an alternative tutorial video is suggested, through a search interface such as search interface 346 discussed with respect to FIG. 3, if such an alternative tutorial video is more applicable than the current video (435). Responsive to user input, a new video data stream is selected (440). The process returns to block 405, which is described above.

Figure 5:
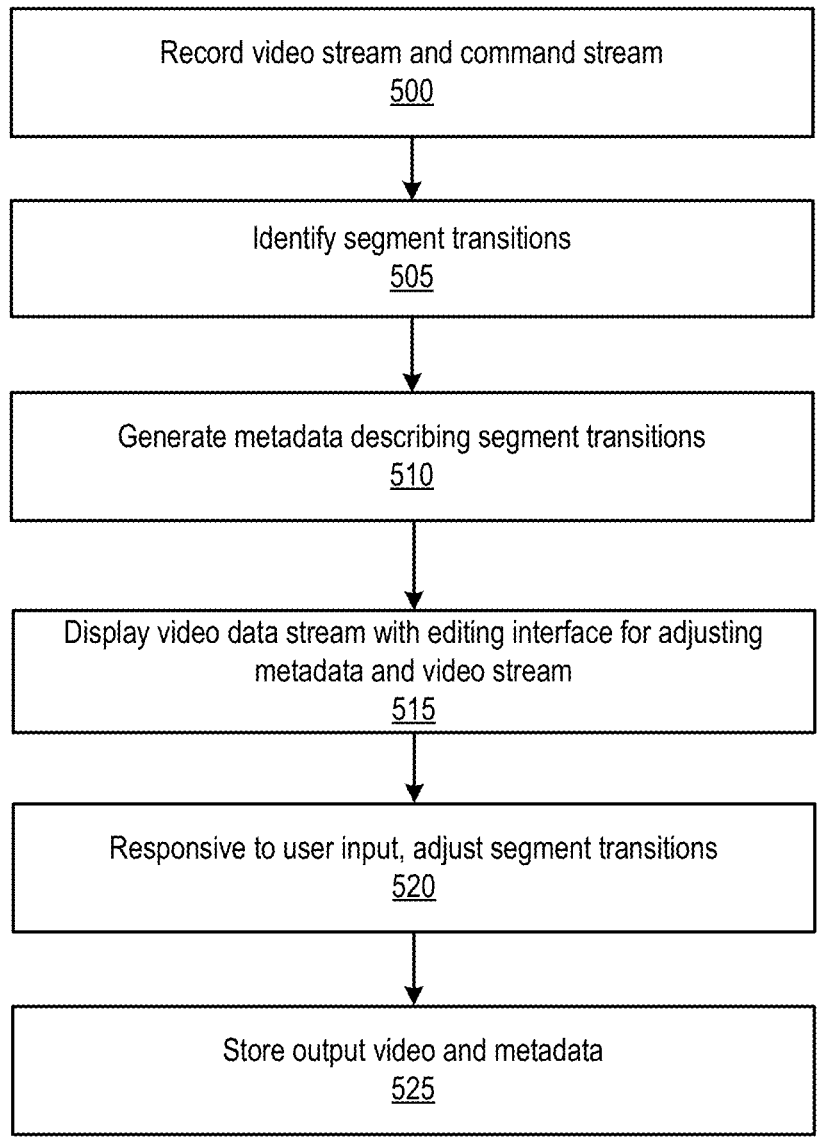
FIG. 5 illustrates a high-level logical flowchart of a process for implementing preparation of a tutorial video with enhancement according to some embodiments.

FIG. 5 illustrates a high-level logical flowchart of an example process for implementing preparation of a tutorial video with enhancement according to some embodiments. A video stream and a command stream are recorded (500). In some embodiments, the video stream may be imported, rather than being recorded on the current user's machine. In some embodiments, only a video stream is recorded and recording of a command stream is omitted.

Segment transitions are identified (505). Metadata describing the segment transitions is generated (510). Data structures for metadata are discussed below with respect to FIG. 7. A video data stream is displayed with an editing interface for adjusting the metadata and the video stream (515) and for adding annotations in the metadata that may be helpful for searching or may be used to provide help text or captioning. Responsive to user input, segment transitions are adjusted (520). Output video and metadata are stored (525) as discussed above with respect to FIG. 1.

Figure 6:
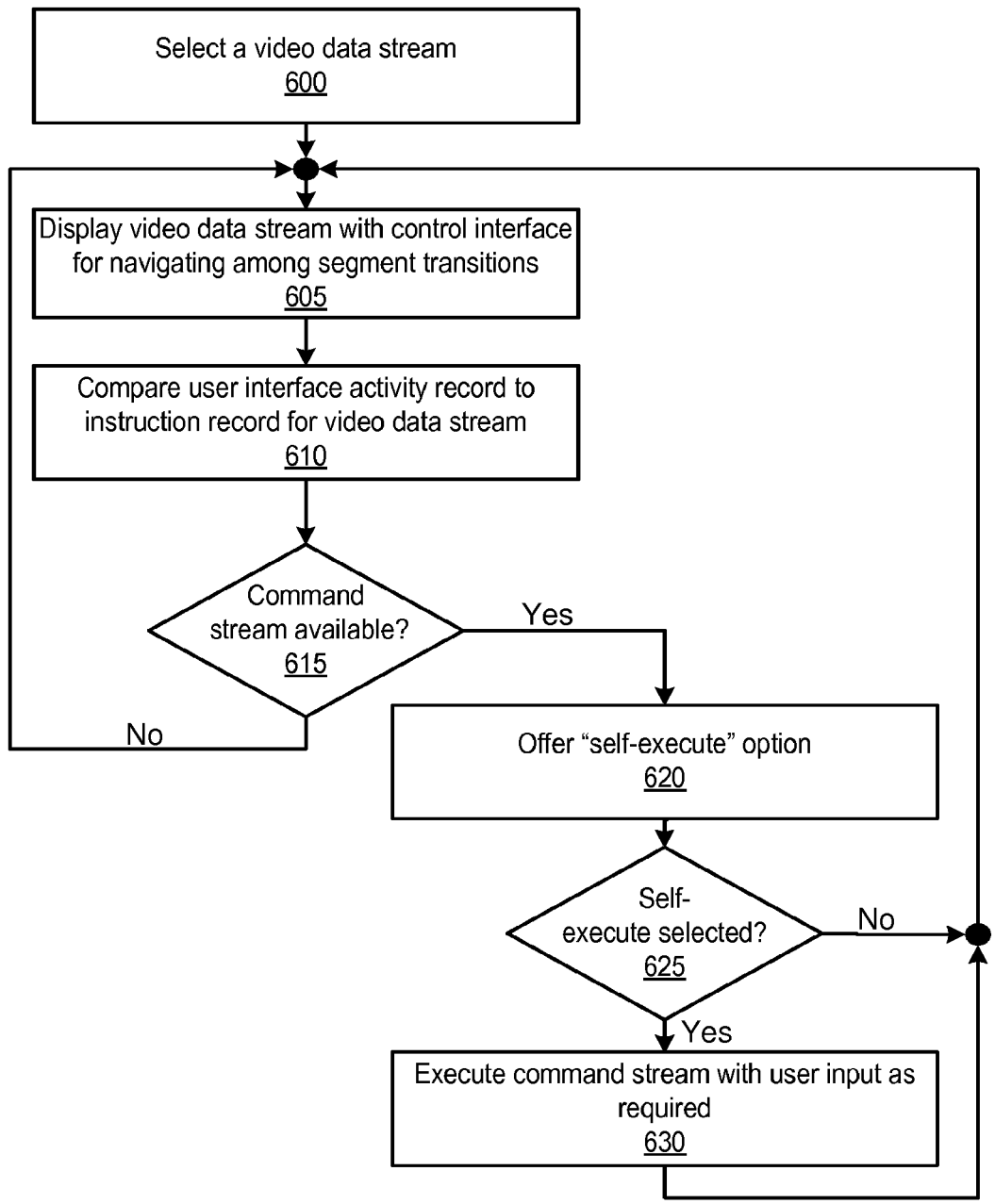
FIG. 6 illustrates a high-level logical flowchart of a process for implementing command record execution from a tutorial video with enhancement according to some embodiments.

FIG. 6 illustrates a high-level logical flowchart of a process for implementing instruction record execution from a tutorial video with enhancement according to some embodiments. A video data stream is selected (600). The video data stream is displayed with a control interface for navigating among segment transitions (605). A user interface activity record, which is generated in a record/monitor mode such as that discussed above with respect to FIG. 3, is compared to an instruction record for the video data stream to form an assessment of the progress of the user through the steps of the tutorial (610).

A determination is made as to whether a command stream from an instruction record is available that can be executed by the application that the user is using (615) during replay of the video. Factors in this determination include the comparison in block 610, compatibility of the instruction record with the current version of an application executing on the user's machine, and other factors. If no command stream is available that can be executed by the application that the user is using, then the process returns to block 605, which is described above. If a command stream is available that can be executed by the application that the user is using, then a self-execute option is offered (620), as discussed above with respect to FIG. 3. A determination is made as to whether the self-execute option has been selected (625). If the self-execute option has not been selected, then the process returns to block 605, which is described above. If the self-execute option has been selected, then a command stream from the instruction record is executed with user input as required (630).

Figure 7:
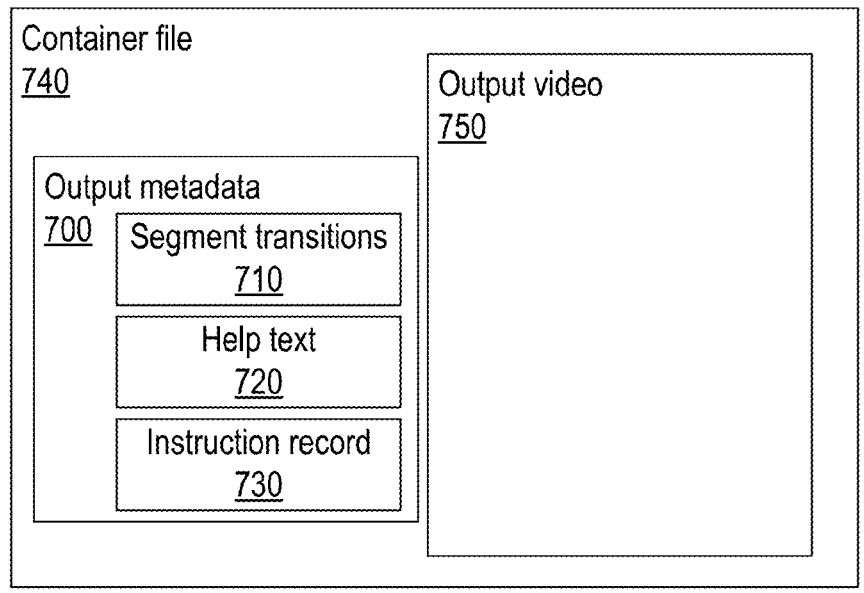
FIG. 7 depicts a data structure for implementing a tutorial video with enhancement according to some embodiments.

FIG. 7 depicts a data structure for implementing a tutorial video with enhancement according to some embodiments. An output metadata structure 700 contains a listing of segment transitions 710 with time codes linking the segment transitions to the video data stream. Additional help text 720, such as explanatory text for display in the video data stream or captioning for hearing impaired users is also stored in output metadata 720. An instruction record 730 correlating application commands to activity visible in a video data stream is also stored in output metadata 700. In some embodiments, output metadata 700 will be stored in a container file 740 with output video 750, which includes the video data stream for display.

Figure 8:
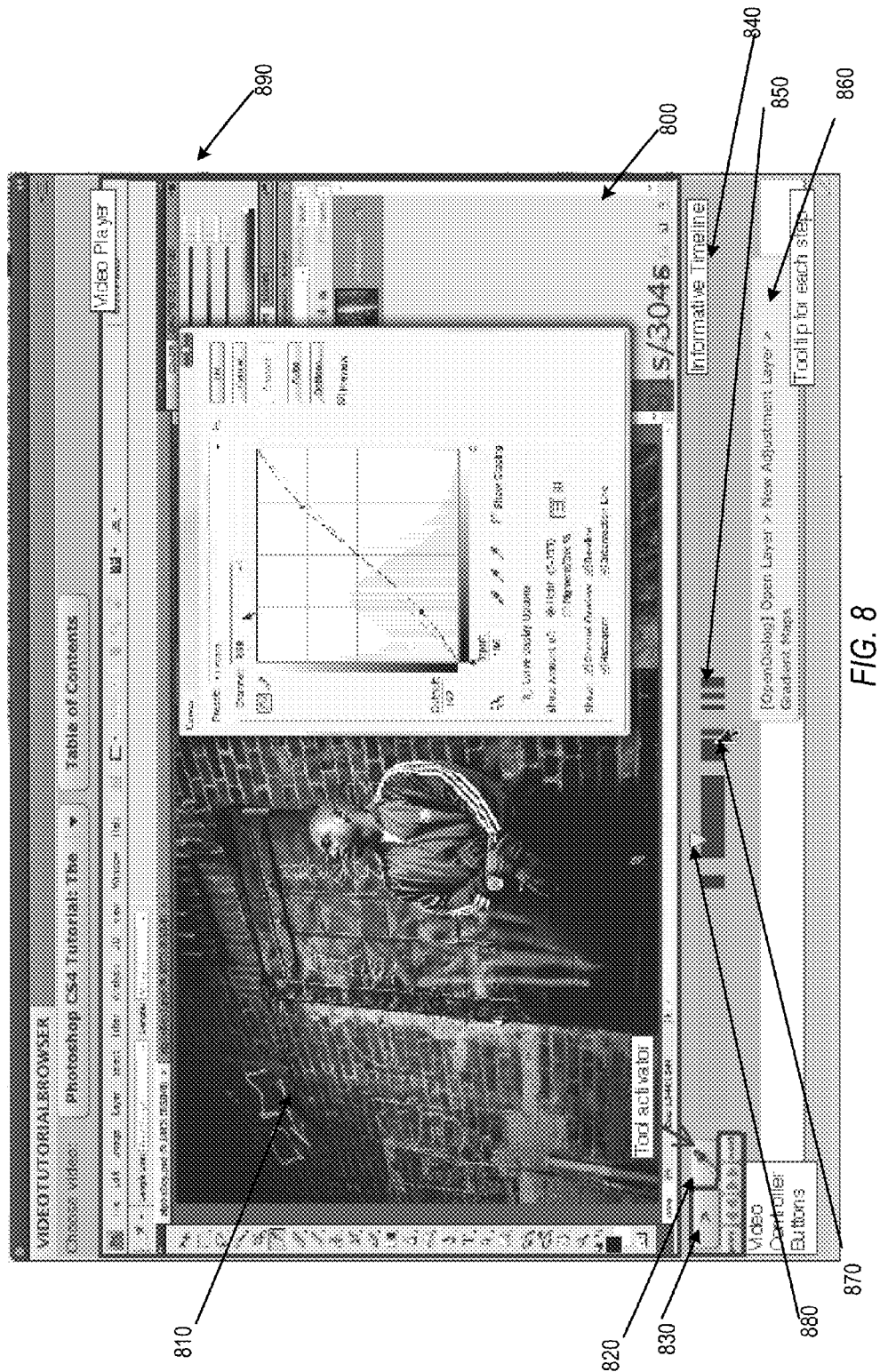
FIG. 8 illustrates a second embodiment of a user interface for implementing tutorial video enhancement.

FIG. 8 illustrates a second embodiment of a user interface for implementing tutorial video enhancement. An application interface 890 contains a video display window 800 for displaying a video stream display 810. A tool activator 820 is provided for executing an operation, the use of which is portrayed in the video stream display 810. Segment navigation controls are provided, including play, next segment, previous segment, 4 second skip, and 4 second reverse. A timeline slider/scrollbar 840 is provided, including color-coded individual segment indicators 850. Annotation text is displayed in a callout 860 in response to pausing a mouse pointer 870 over a segment.

Example System

Embodiments of an enhanced video tutorial display tool, an enhanced video tutorial authoring tool, an instruction sequence execution tool, and a tutorial video search tool, and/or of the various enhanced video tutorial display and preparation techniques as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a segment navigation module are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via TELECOMMUNICATIONS/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement embodiments of a segment navigation module as described herein, and data storage 935, comprising various data accessible by program instructions 925. In one embodiment, program instructions 925 may include software elements of embodiments of a segment navigation module as illustrated in the above Figures. Data storage 935 may include data that may be used in embodiments. In other embodiments, other or different software elements and data may be included.

Those skilled in the art will appreciate that computer system 900 is merely illustrative and is not intended to limit the scope of a segment navigation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   receiving a tutorial video data stream that displays a user interface of an application running in the tutorial video data stream;
   analyzing the tutorial video data stream to identify an appearance of an editing toolbar representation or a dialogue box representation in the user interface, the analyzing comprising analyzing the tutorial video data stream using computer vision to identify shape or color patterns in the tutorial video data stream representative of the editing toolbar representation or the dialog box representation;
   classifying each identified editing toolbar representation or dialogue box representation as a segment transition;
   generating metadata associating the segment transitions with corresponding points in the tutorial video data stream;

providing a navigation system for navigating among the plurality of segment transitions in the tutorial video data stream; and responsive to input selecting one of the plurality of segment transitions from the navigation system, navigating to the selected segment transition and causing display of the tutorial video data stream from a corresponding point in the tutorial video data stream.

2. The method of claim 1, further comprising:

capturing an instruction record representing a plurality of instructions executed by the application running in the tutorial video data stream; and associating a selected instruction from among the plurality of instructions with the selected segment transition in the metadata.

3. The method of claim 2, further comprising:

capturing an interface activity record of interactions with the application while the tutorial video data stream is being displayed;

comparing the interface activity record to the instruction record; and responsive to a deviation between the instruction record and the interface activity record, adjusting display of the tutorial video data stream.

4. The method of claim 3, wherein:

the deviation comprises a time difference between the instruction record and the interface activity record; and the adjusting the display of the tutorial video data stream further comprises pausing playback of the tutorial video data stream.

5. The method of claim 3, wherein:

the deviation comprises an instruction selection difference between the instruction record and the interface activity record; and the adjusting the display of the tutorial video data stream further comprises suggesting an alternative video data stream.

6. The method of claim 3, further comprising responsive to a request, executing a subset of the plurality of instructions in the interactions with the application while the tutorial video data stream is being displayed.

7. The method of claim 3, wherein the causing the display of the tutorial video data stream from the corresponding point is performed via the interactions with the application while the tutorial video data stream is being displayed.

8. A system, comprising:

at least one processor; and a memory comprising program instructions that, responsive to execution by the at least one processor, are configured to:

responsive to receiving a tutorial video data stream that displays a user interface of an application running in the tutorial video data stream, analyze the tutorial video data stream to identify an appearance of an editing toolbar representation or a dialogue box representation in the user interface, the analyzing comprising analyzing the tutorial video data stream using computer vision to identify shape or color patterns in the tutorial video data stream representative of the editing toolbar representation or the dialog box representation;

classify one or more of the identified editing toolbar representations or dialogue box representations as a segment transition;

generate metadata associating the segment transitions with corresponding points in the tutorial video data stream;

provide a navigation system for navigating among the plurality of segment transitions in the tutorial video data stream; and responsive to input selecting one of the plurality of segment transitions from the navigation system, navigate to the selected segment transition and cause display of the tutorial video data stream from a corresponding point in the tutorial video data stream.

9. The system of claim 8, wherein the program instructions, responsive to execution by the at least one processor, are further configured to:

capture an instruction record representing a plurality of instructions executed by the application running in the tutorial video data stream; and associate a selected instruction from among the plurality of instructions with the selected segment transition in the metadata.

10. The system of claim 9, wherein the program instructions, responsive to execution by the at least one processor, are further configured to:

capture an interface activity record of interactions with the application while the tutorial video data stream is being displayed;

compare the interface activity record to the instruction record; and responsive to a deviation between the instruction record and the interface activity record, adjust display of the tutorial video data stream.

11. The system of claim 10, wherein:

the deviation comprises a time difference between the instruction record and the interface activity record; and the program instructions, responsive to execution by the at least one processor, are further configured to adjust the display of the tutorial video data stream by pausing playback of the tutorial video data stream.

12. The system of claim 10, wherein the deviation comprises an instruction selection difference between the instruction record and the interface activity record; and the program instructions, responsive to execution by the at least one processor, are further configured to adjust the display of the video data stream by suggesting an alternative video data stream.

13. The system of claim 10, wherein the program instructions, responsive to execution by the at least one processor, are further configured to execute a subset of the plurality of instructions in the interactions with the application while the tutorial video data stream is being displayed.

14. The system of claim 10, wherein the program instructions, responsive to execution by the at least one processor, are further configured to cause the display of the tutorial video data stream from the corresponding point via the interactions with the application while the tutorial video data stream is being displayed.

15. A computer-readable storage device comprising program instructions stored thereon that, responsive to execution, perform a method comprising:

responsive to receiving a tutorial video data stream that displays a user interface of an application running in the tutorial video data stream, analyzing the tutorial video data stream to identify an appearance of an editing toolbar representation or a dialogue box representation in the user interface, the analyzing comprising analyzing the tutorial video data stream using computer vision to identify shape or color patterns in the tutorial video data stream representative of the editing toolbar representation or the dialog box representation;

classifying one or more of the identified editing toolbar representations or dialogue box representations as a segment transition;

generating metadata associating the segment transitions with corresponding points in the tutorial video data stream;

providing a navigation system for navigating among the plurality of segment transitions in the tutorial video data stream; and responsive to input selecting one of the plurality of segment transitions from the navigation system, navigating to the selected segment transition and causing display of the tutorial video data stream from a corresponding point in the tutorial video data stream.

16. The computer-readable storage device of claim 15, wherein the program instructions, responsive to execution, are configured to perform a method further comprising:

capturing an instruction record representing a plurality of instructions executed by the application running in the tutorial video data stream; and associating a selected instruction from among the plurality of instructions with the selected segment transition in the metadata.

17. The computer-readable storage device of claim 16, wherein the program instructions, responsive to execution, are configured to perform a method further comprising:

capturing an interface activity record of interactions with the application while the tutorial video data stream is being displayed;

comparing the interface activity record to the instruction record; and responsive to a deviation between the instruction record and the interface activity record, adjusting display of the tutorial video data stream.

18. The computer-readable storage device of claim 17, wherein:

the deviation comprises a time difference between the instruction record and the interface activity record; and the adjusting the display of the tutorial video data stream further comprises pausing playback of the tutorial video data stream.

19. The computer-readable storage device of claim 17, wherein:

the deviation comprises an instruction selection difference between the instruction record and the interface activity record; and the adjusting the display of the tutorial video data stream further comprises suggesting an alternative video data stream.

20. The computer-readable storage device of claim 17, wherein the program instructions, responsive to execution, are configured to perform a method further comprising executing a subset of the plurality of instructions in the interactions with the application while the tutorial video data stream is being displayed.

* * * * *